(No Model.) 3 Sheets—Sheet 1.
W. WHITE.
FEED WATER REGULATOR FOR STEAM BOILERS.
No. 315,098. Patented Apr. 7, 1885.
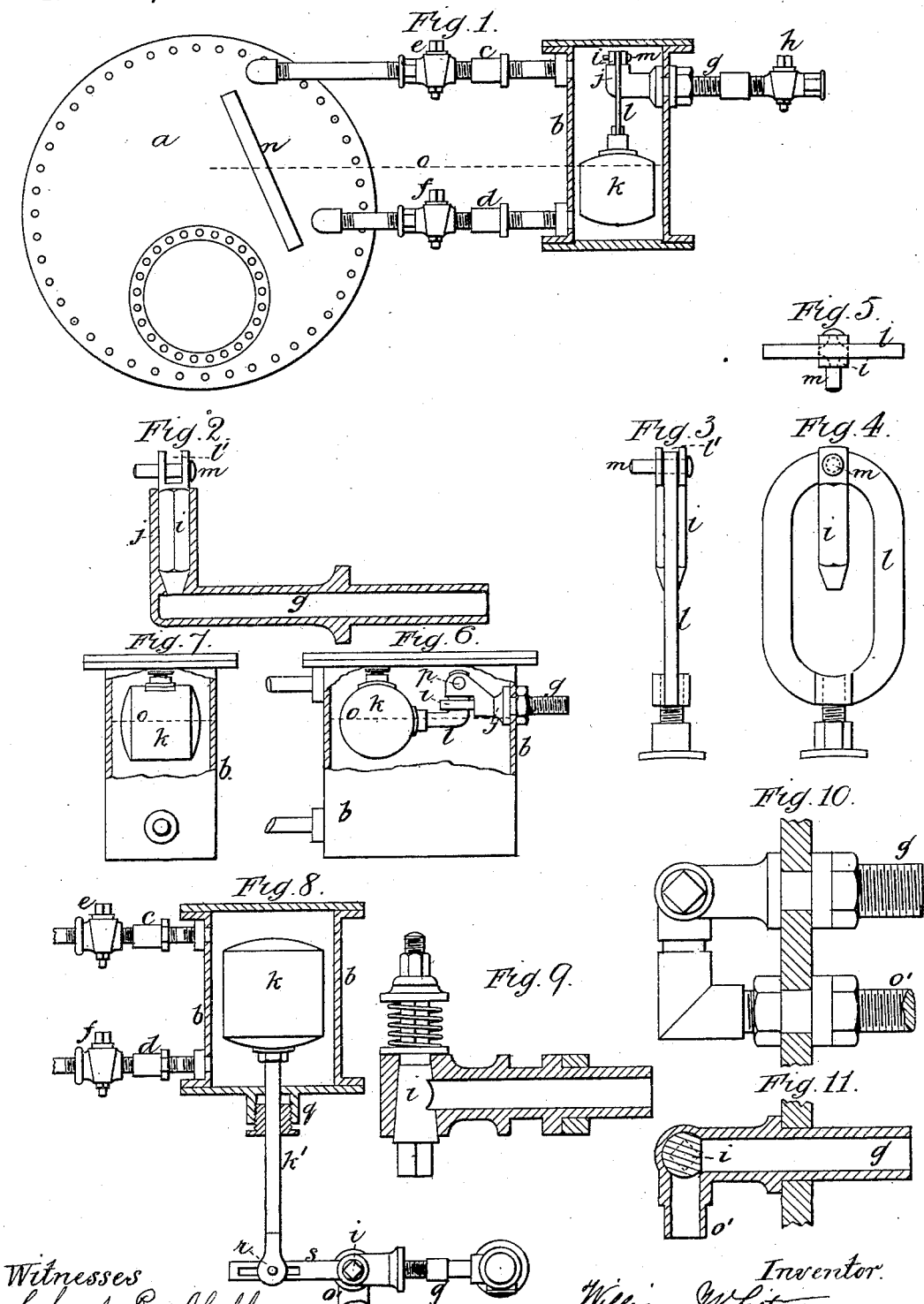
Witnesses
Chas. R. Abell
M. Chaffee
Inventor
William White
by John J. Halsted & Son
his Atty's (No Model.) 3 Sheets—Sheet 2.
W. WHITE.
FEED WATER REGULATOR FOR STEAM BOILERS.
No. 315,098. Patented Apr. 7, 1885.
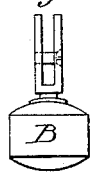
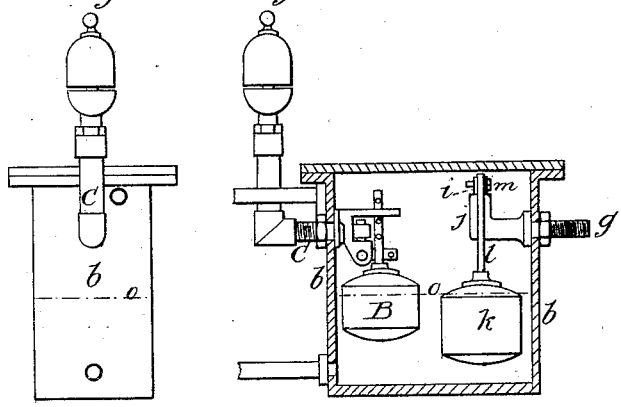
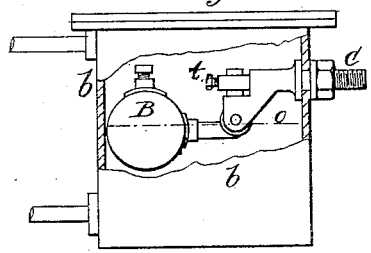
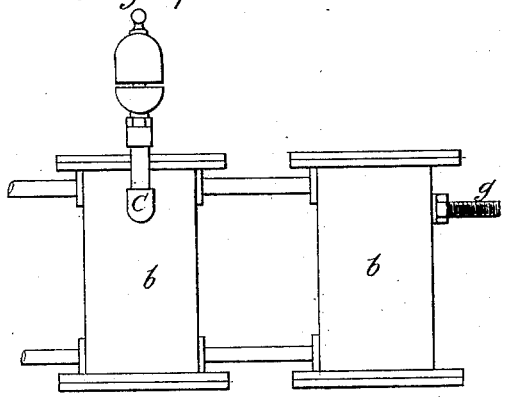
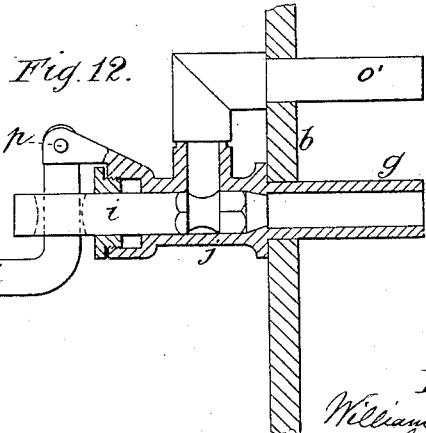

(No Model.) 3 Sheets—Sheet 3.

W. WHITE.
FEED WATER REGULATOR FOR STEAM BOILERS.

No. 315,098. Patented Apr. 7, 1885.

Witnesses
Chas. R. Abell
W. R. Chaffer

Inventor
William White
by John J. Halsted & Son
his Atty's

UNITED STATES PATENT OFFICE.

WILLIAM WHITE, OF LONDON, ENGLAND, ASSIGNOR TO WILLIAM STEIN, OF SAME PLACE.

FEED-WATER REGULATOR FOR STEAM-BOILERS.

SPECIFICATION forming part of Letters Patent No. 315,098, dated April 7, 1885.

Application filed October 4, 1883. (No model.) Patented in England May 7, 1883, No. 2,307; in Germany September 21, 1883, No. 27,326; in France September 24, 1883, No. 157,698, and in Belgium September 28, 1883, No. 62,735.

*To all whom it may concern:*

Be it known that I, WILLIAM WHITE, a subject of the Queen of Great Britain, residing at London, England, have invented a new and useful Improvement in Feed-Water Regulators for Steam-Boilers, also applicable to working boiler-whistles, (for which I have obtained a patent in Great Britain, No. 2,307, bearing date May 7, 1883,) of which the following is a specification.

This invention has for its object the regulation of the feed or supply of water into steam-boilers by means of an improved apparatus which automatically keeps the water in the boiler at one level, so long as the injection-pump acts, and thus renders it impossible for a boiler to explode for want of water; and, further, as a safeguard against the pump failing to act, I place a whistle on the boiler or on the apparatus, which, being worked by the float, hereinafter described, would act and give an alarm if, through accident or otherwise, the water should fall below the proper level; and the invention consists in providing a float and valve so constructed and arranged that so long as the water in the boiler is not below the normal level the valve remains open, and steam from the boiler or air from the atmosphere passes into the injection-pump or suction-pipe, and prevents the pump from throwing any water; but immediately the water falls below the normal level the float, falling with the water, closes the valve thereof, shutting off the steam or the air from the pump or suction pipe, and the pump will throw water and feed the boiler.

Should the water in the boiler fall below the normal level, and the pump not act from any cause whatever, a whistle is provided, also operated by a float in such a manner as to sound an alarm.

In order to enable my invention to be fully understood, I will proceed to describe the same by reference to the accompanying drawings, in which—

Figure 18:
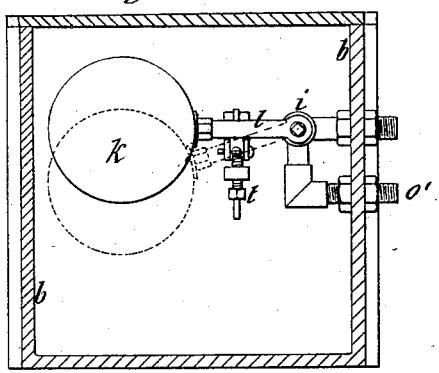
Figure 19:
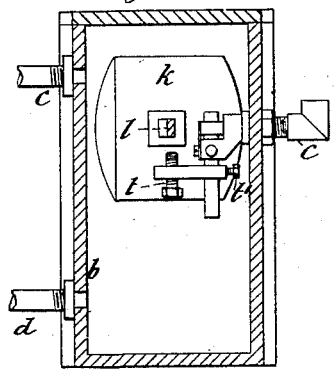
Figure 20:
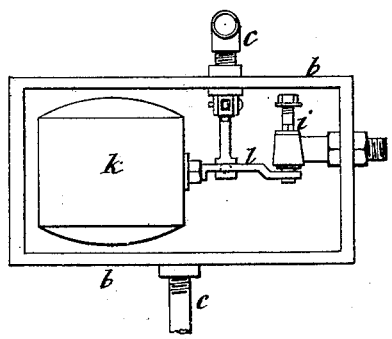

Figure 1 represents a part end view of a steam-boiler with my improved apparatus applied thereto, as constructed when the pump is operated by steam; Figs. 2, 3, 4, and 5, detached enlarged views of some of the parts; Figs. 6 and 7, longitudinal and transverse sectional elevations of a modified arrangement of apparatus; Fig. 8, a sectional elevation of the apparatus as arranged when air is admitted to the pump; Figs. 9, 10, and 11, detached enlarged views of the valve; Fig. 12, a vertical section of another form of valve for operating the pump by atmospheric air. Fig. 13 shows a sectional elevation of the whistle arrangement. Figs. 14 and 15 represent an end view and sectional elevation, respectively, showing a whistle arrangement combined with the self-acting regulating apparatus; Fig. 16, a detached view of the float; and Fig. 17 is an elevation showing the self-acting arrangement for operating the pump and the whistle arrangement placed in separate chambers connected together; Figs. 18, 19, and 20, longitudinal section, transverse section, and plan, respectively, of an arrangement in which one float is employed to operate the pump and whistle.

Similar letters in all the figures represent similar or corresponding parts.

In the arrangement shown in Fig. 1, $a$ represents an ordinary steam-boiler, and $b$ a chamber in communication with the boiler $a$ by the connections $c$ and $d$, the former, $c$, opening into the steam-space in the boiler $a$, and the latter connection, $d$, opening into the water-space in the boiler, so that the level of the water in the chamber $b$ is the same as that in the boiler $a$; $e$ and $f$, stop-cocks for shutting off communication between the chamber $b$ and boiler $a$, when required. $g$ is a pipe from the chamber $b$, and communicating with the feed-pump or suction-pipe; $h$, stop-cock of the pipe $g$. The pipe $g$ projects into the chamber $b$, as shown, and is provided with a valve, $i$, and valve-box $j$, as shown in the enlarged sectional view at Fig. 2. $k$ is a float connected by the bow $l$ (shown in detached enlarged views at Figs. 3, 4, and 5) to the valve $i$, the head of the bow fitting in the slot $l'$ in the valve $i$, in which it is secured by the pin $m$. $n$ is the usual water-gage. The dotted line $o$ shows the water-level which it is desired to maintain within the boiler. By this arrangement it will be evident that if the valve $i$ and float $k$ be arranged so that when the water in the boiler is above the normal level, the valve $i$ shall be open, steam from the chamber $b$ will pass through the pipe $g$ into the feed-pump, and thereby prevent the same from working, so that no water will be thrown into the boiler $a$. As soon, however, as the water in the boiler $a$ is evaporated down to or below its proper level, the float, falling with the water, will close the valve $i$, thereby shutting off the steam from the pump, which will then begin to act and feed the boiler, and so on, by which means the level of the water will vary but slightly, as I have found in practice that the apparatus is very sensitive.

The arrangement of apparatus shown in Figs. 6 and 7 is substantially the same as that shown in Fig. 1, except that the valve $i$ is arranged horizontally instead of vertically, the float $k$ being fixed to the end of a bent lever, $l$, the upper end of which works in a center or fulcrum at $p$.

The operation is substantially the same as that hereinbefore described, and therefore needs no further description.

Fig. 8 shows one of the arrangements I have found to answer when atmospheric air is admitted to the pump. In this case the float $k$ is provided with a rod, $k'$, which passes through a stuffing-box, $q$, in the bottom end of the chamber $b$. The lower end of the rod has a double eye, $r$, which clips over the lever $s$ on the valve-cock $i$ in the pipe leading to the pump.

When the water in the boiler is above the normal level, the valve-cock $i$ is open, and air can pass from the air-inlet $o'$ to the pump, which will thereby be prevented from acting; but if the level of the water falls, the float $k$ falls with it and closes the valve-cock $i$, and the pump will act and throw water into the boiler, and so on, the action being substantially the same as in the arrangement of steam apparatus hereinbefore described. Figs. 9, 10, and 11 are detached enlarged details of the valve-cock and the connections, showing how they may be fixed inside a chamber, if required.

Fig. 12 shows on an enlarged scale a horizontal arrangement of valve for the same purpose, and its operation, being substantially the same as that of the valve shown in Fig. 8, will be understood without further description, $o'$ being the air-inlet.

In all cases a stop-valve should be placed near the pump in the pipe leading from the regulating apparatus to prevent water from the pump entering the pipe $g$.

The arrangement for blowing a whistle in case the water should fall below the normal level and the pump cease to act is substantially the same as that for operating the pump, except that when the float falls a valve is opened and steam allowed to pass through and blow a whistle. Such an arrangement is shown in Fig. 13, in which figure $b$ is a chamber connected with the boiler, similarly to the chamber of the self-regulating apparatus hereinbefore described. B is a float connected with the valve on the pipe C, which communicates with a steam-whistle. If the water falls below a certain level, (which level may vary by adjusting the lever operating the valve by means of the set-screw $t$,) the float also falls and opens the valve, thereby allowing the steam to pass to and sound the whistle.

In Figs. 14 and 15 the apparatus for working the pump and that for working the whistle are shown in one chamber, while Fig. 17 shows two separate chambers connected together, one containing the pump apparatus and the other the whistle apparatus. Fig. 16 is a detached view of the form of float preferred for the whistle apparatus.

In some cases it may be advantageous to operate the pump and whistle by means of one float, the rising of the float closing the steam or air valve leading to the pump, and the falling of the float opening the valve for blowing the whistle. Such an arrangement is shown in Figs. 18, 19, and 20.

When the water in the boiler is above the normal level, the float $k$ rises and atmospheric air or steam (as the case may be) enters through the pipe $o'$, and passes through the valve $i$ into the pump and stops its acting. Upon the float falling the lever $l$, coming against the set-screw $t$, will open the valve, and steam will pass through the valve to the whistle, and the whistle will be blown, the valve being normally held to its seat when the float is not in contact with its set-screw by any known or ordinary means—as, for instance, by gravity or by spring or other pressure.

The set-screws $t\ t'$ are for the purpose of regulating the height at which the float shall open the valve.

It will be obvious that my improved apparatuses may be placed within the boiler itself, instead of in separate chambers outside the boiler, as hereinbefore described; also, that by connecting the bottom of the chamber containing the apparatus with the pump the boiler can be fed by passing the water through the chamber, instead of it passing direct from the pump to the boiler.

Among the advantages resulting from the use of my improved apparatus may be mentioned, first, the prevention of boiler explosions from the want of a proper and regular supply of water; secondly, saving of labor by dispensing with an attendant to the pump and boiler; thirdly, the better regulation of the pressure of steam by the water being practically maintained at one level in the boiler; fourthly, saving of fuel, which must necessarily be effected by avoiding the necessity of large quantities of cold water having to be pumped into the boiler at one time, as hitherto under the present system of working the boiler and pump.

Having thus described my said invention and the best means I am acquainted with for carrying the same into effect, I wish it to be understood that what I claim is—

The described combination and arrangement of the chamber $b$ and its inclosed float with the boiler by means of the connecting-pipes $c\ d$, and with the water-supply by means of the feed-pipe $g$, the combination operating, as set forth, to pass steam to the feed-pump and prevent its acting when the water is at or above its normal level, and to close the float-actuated valve and shut off the steam from the pump when the water falls below such level.

W. WHITE.

Witnesses:
G. F. REDFERN,
W. H. TOOTH.